United States Patent Office 3,533,218
Patented Oct. 13, 1970

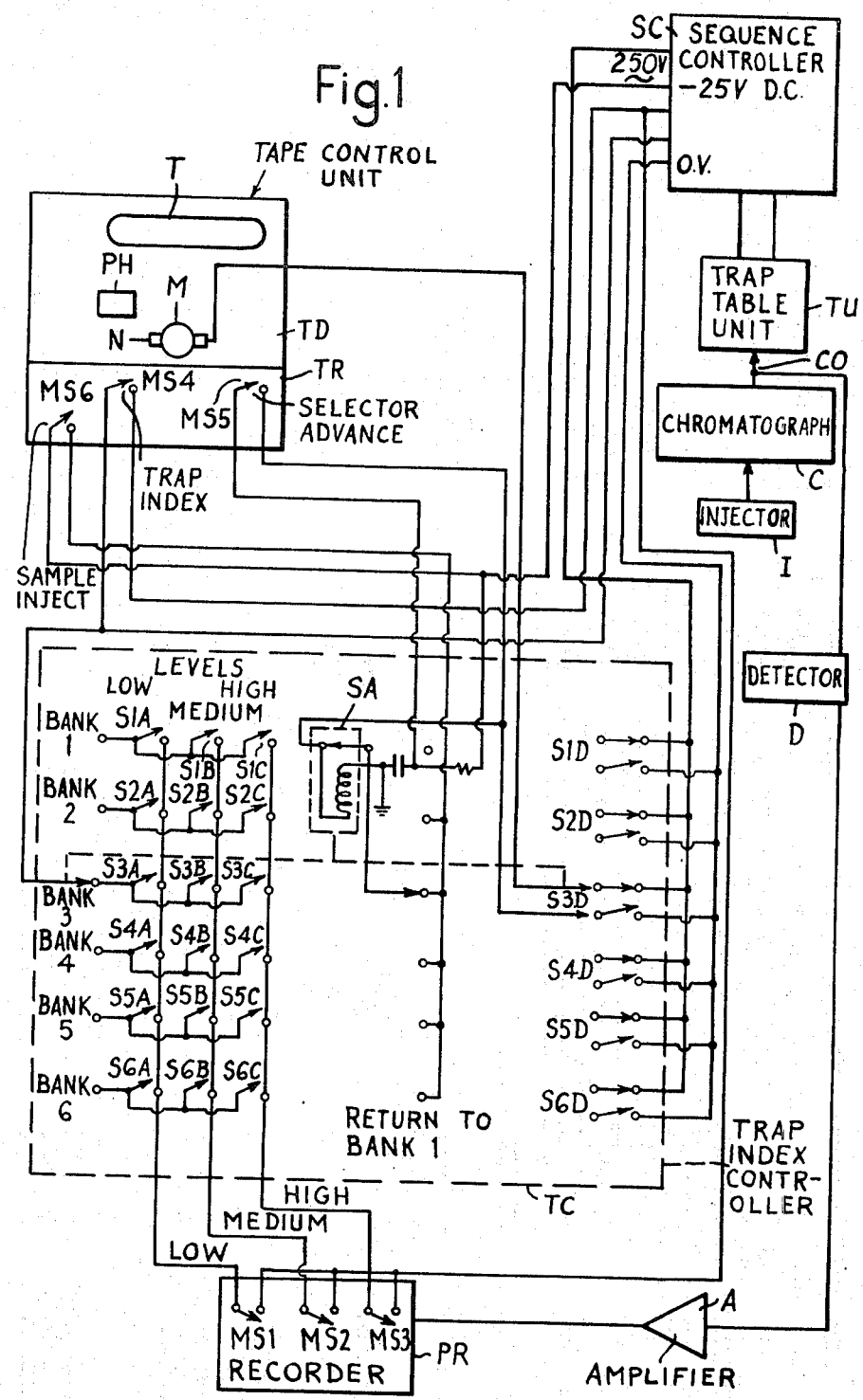

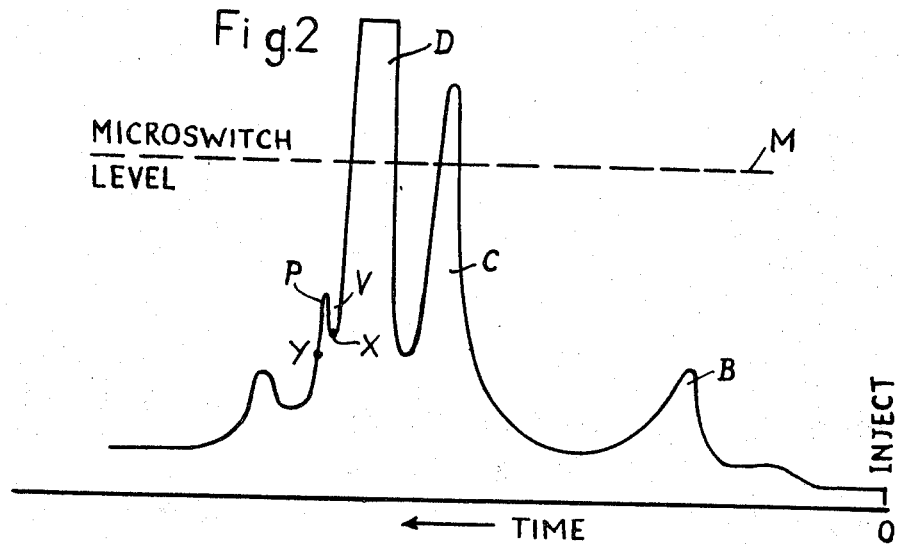
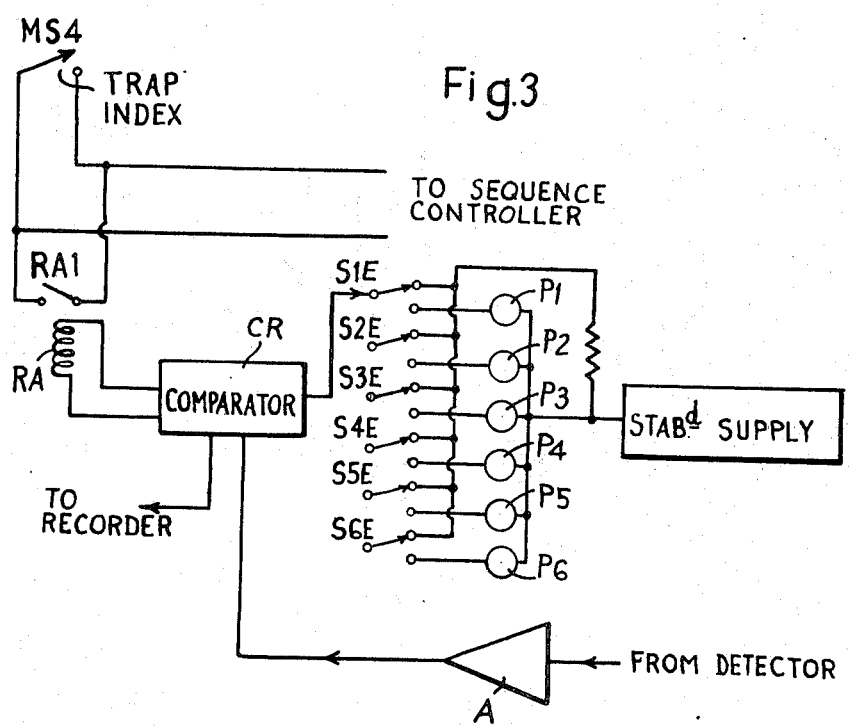

3,533,218
GAS CHROMATOGRAPHY APPARATUS
Richard J. Hunt, Anthony Jenkins, and Frank P. Speakman, Cambridge, England, assignors to Pye Limited, Cambridge, England, a British company
Filed Sept. 24, 1968, Ser. No. 761,904
Claims priority, application Great Britain, Sept. 30, 1967, 44,629/67; July 25, 1968, 35,661/68
Int. Cl. B01d 15/08
U.S. Cl. 55—386                                      13 Claims

ABSTRACT OF THE DISCLOSURE

This invention relates to gas chromatography apparatus wherein the effluent from a chromatograph column is selectively fed into a series of collecting traps presented to the outlet of the column in accordance with a predetermined programme, wherein a control system is provided to enable the traps to be changed at different preselected levels of the output from a chromatograph detector.

---

The present invention relates to gas chromatography apparatus and more particularly to an improved control system for such apparatus wherein the effluent from a chromatograph column is selectively fed into a series of collecting traps which are presented in turn to the outlet of the column, in order respectively to receive separated components of a mixture passing through the column.

The control system employs a programme tape which is prepared so that, when the tape is run, it causes the actuation of means controlling the operation of a trap changing mechanism to present successive traps to the outlet of the column in accordance with the predetermined programme. The programme tape is normally prepared by manually controlling the sequence of operation of the chromatograph apparatus to produce the desired separation of the components appearing at the outlet from the column into the different traps, and simultaneously producing a control signal on the tape, e.g. by punching a hole in the tape, each time that a manual instruction is carried out. In this way, subsequent separations of the components of a similar mixture passed through the column can be achieved automatically by running the tape thus prepared through a suitable tape reader to control mechanisms for effecting the trap changing and other operations of the apparatus. Thus, the control signals on the programme tape may also control the operation of a recording device producing a chromatogram, e.g. control the operation of a pen recorder, as well as control the injection of a sample on to the column and also control the temperature of the column. The arrangement may be such that traps are only presented to the outlet of the column to collect selected separated components, other components which it is not desired to collect being allowed to run to waste.

With such an arrangement it is difficult to compensate for small changes in the size of the samples injected into the column, the operating temperatures or gas flow rates through the column, and these variations may result in the chromatogram being displaced in time in relation to the instructions initiated from the control signals on the tape, especially towards the end of a long separation programme. The peaks produced on the chromatogram may vary in height and cause a possible loss of a component if a peak falls below the level on the recorder necessary to initiate the action of changing traps.

According to a feature of the invention the control system provides a plurality of different levels on the recorder at which the trap changing mechanism is caused to operate, these levels being selected as required, and being changed as the separation progresses by means of a control signal derived from the programme tape.

According to a further feature of the invention, means are provided for stopping the programme tape at any time during the programme and restarting it at a precise point on the chromatogram, thereby resynchronising the operation of the tape with the chromatogram.

Furthermore, in carrying out separations having long periods during which no significant component is emerging from the column, the amount of control tape required can be reduced by stopping the tape drive at a preselected point and restarting it automatically at the point when the chromatogram reaches a selected level.

According to a further feature of the invention, if the sampling system or some other part of the apparatus should fail, the tape can be stopped shortly after the sample injection period and is only restarted if a peak on the chromatogram reaches a selected level, thereby avoiding a possible loss of a valuable sample.

Advantageously the tape is punched with holes representing the control signals and is associated with switch means which are operated when any hole in the tape, which is run at a continuous fixed speed, passes over the associated switch means.

The different levels of operation may be controlled by means of switches on the recorder which are set to operate at different levels above a datum or base line on the chromatogram and which are respectively operated when the pen on the recorder reaches the position of the associated switch.

Alternatively the different levels of operation may be controlled by means of a comparator circuit arranged to operate on predetermined different levels of the output signal from the chromatographic detector.

The invention will now be further described by way of example, with reference to the accompanying drawings, in which:

FIG. 1 is a simplified diagram of one embodiment of preparative chromatograph incorporating a control system according to this invention, FIG. 2 shows part of a chromatogram, and FIG. 3, is a simplified diagram showing part of a modified embodiment.

Referring to the drawings and particularly FIG. 1, the apparatus basically comprises a chromatograph C including a preparative chromatograph column contained in a temperature-controlled oven and fed with samples by an injector I, a sequence controller SC, a trap index controller TC, a detector D, an amplifier A, a pen recorder PR, a tape drive and control unit TD and a trap change unit TU.

A motor (not shown) indexes the turntable of the trap change unit TU through successive angular positions at appropriate times during the operation of a programme, to bring different traps in line with the outlet CO from the chromatograph column. Traps are only provided on the turntable at those indexed positions where it is desired to collect samples, and at other positions the effuent from the chromatograph column may be allowed to flow to waste. The sequence controller SC automatically controls the operation of the trap turntable to successive indexed positions in accordance with a programme determined by the holes punched in the endless tape T which is driven at a fixed speed by the motor M. The holes in the tape operate micro-switches to control the operation of the trap changing mechanism, as will be hereinafter described.

As mentioned previously, a desired programme is set up on the tape by manually controlling the operation of the apparatus during the passage of a sample through the chromatograph column and by punching a hole in the tape each time that a manual instruction is carried out. Holes are also punched in the tape to provide control signals initiating the start of a cycle of operation, the injection of a sample on to the chromatograph column, the changing of the traps, and to control the temperature of the analyser oven containing the chromatograph column. It will be understood that a fraction of the effluent from the column is passed to the detector D whose output signal is amplied by amplifier A and fed to operate the pen on the recorder PR.

The tape control unit TD comprises a punch head PH for punching holes in the tape, a tape reader TR and the drive motor M. The micro-switches MS4, MS5 and MS6 on the reader respectively close circuits connected to the trap index controller TC, a selector advance mechanism SA and sample injection apparatus I.

In this embodiment three micro-switches MS1, MS2 and MS3 are provided on the recorder PR which can be respectively set to operate at different levels above the datum or base line of the chromatogram and which are respectively designated "low," "medium," "high." The micro-switches are effectively connected in parallel with the micro-switch MS4 on the tape control unit but are only operative if one of the press-button operated switches (S1A to S6C) on the banks 1 to 6 of the trap index controller TC is set in a suitable position and the solenoid actuator SA has selected that bank, as described below.

The trap index controller TC contains six banks, 1 to 6, of four switches S1A to S1D . . . S6A to S6D, each bank being selected in turn by means of the solenoid actuator SA which is advanced by the closing of the selector advance switch MS5 in the tape unit TD. When a sample is injected onto the column, the solenoid actuator SA is returned to the first bank by the action of switch MS6. Three of the switches (S1A, S1B, S1C etc.) in each bank are on/off switches and the fourth switch S1D etc., is a two-pole changeover switch. The three switches (S1A, S1B, S1C etc.) in each bank are connected in parallel and each one is connected in series with one of the micro-switches MS1, MS2 and MS3 on the recorder, representing the different levels. The switches in the trap index controller are operated by push-buttons and when a switch in a particular bank is closed and that particular bank is selected by the solenoid actuator SA, then when the pen on the recorder passes the micro-switch which is connected in series with the switch which has been closed, the circuit to the trap index terminals on the sequence controller SC is completed and the trap control unit TU causes the trap turntable to index one position thereby presenting a new trap to the outlet of the column. Thus, the trap indexes at a particular signal level on the recorder. The three micro-switches MS1, MS2, MS3 fitted to the recorder can be adjusted in position so as to be operated by the pen at any level with respect to the reference or datum of the recorder and each level can be selected as required by operating the push-button to close the appropriate switch on the trap index controller.

The fourth push button, S1D etc., in each bank, controls two circuits. Thus, when it is depressed together with one of the other three push buttons in the bank and that particular bank is selected by the solenoid actuator SA, its upper pole (as seen in FIG. 1) opens to disconnect the supply from the tape drive motor and its lower pole closes to connect a circuit which causes the solenoid actuator to advance to the next bank when the recorder pen passes the level which has been selected by closing the appropriate switch, of the first mentioned bank. This means that when the selector advance control is depressed to close switch MS5 and cause the solenoid actuator SA to advance to a bank in which the fourth push button is depressed (together with one of the three other push buttons), the tape drive is stopped. This condition persists until the recorder pen passes the selected level micro-switch, when the trap index controller automatically advances to the next bank on which the fourth push button is not depressed and the tape drive restarts.

In practice this means that the time base of the tape has been synchronised with a particular level of the recorder signal. This level is selected to be at an unambiguous point on the chromatogram and in this manner accurate synchronisation is achieved.

Thus, it is possible to synchronize the tapes and chromatogram at the leading or trailing edge of a major peak and then exactly time the interval before the next peak of interest. This means that a peak can be selected accurately even after a long programme, by resynchronisation as described above.

Moreover, by means of the system according to the invention it is possible to obtain a considerable saving of tape and the tape can be stopped in the event of the sample being exhausted.

FIG. 2 shows a chromatogram of part of a sample mixture on which it is desired to pick out the peak marked P. The valley V immediately before it lasts only a second and therefore due to probable variations in the system cannot be picked off on a time basis to the required accuracy when measured from the time of sample injection.

Also, it cannot easily be sensed by micro-switch operation due to its position and its size closely adjacent the large peak D. The tape can however be stopped easily by advancing to a stage with a tape stop selected while the large peak D is off scale. The tape then restarts when the tail of D operates a micro-switch set at the preselected level M and the trap change points X and Y are easily picked up after that on a time basis under control of the tape.

FIG. 3 shows a modification to the arrangement of FIG. 1 wherein the switches S1A to S6C, as well as the micro-switches MS1, MS2 and MS3 are dispensed with. In this embodiment the output from amplifier A is fed to a comparator circuit CR where the amplifier output is compared with a level signal selected from any one of six potentiometers P1 to P6 each of which is associated with one of the banks 1 to 6. The six push-button operated changeover switches S1E to S6E are respectively connected in series with the potentiometers P1 to P6. When these are not actuated, i.e. the switches are in the position shown, the potentiometers are not connected to the comparator circuit and a large signal is supplied to one side of the comparator circuit so that the amplifier output can never reach this level, and hence the contact RA1 of a relay RA is never closed and the traps will not index. When the push button corresponding to a particular potentiometer is depressed the appropriate switch is operated and the signal supplied by that potentiometer is compared with the signal from the amplifier, provided that particular potentiometer has been selected. The potentiometers are fed from a stabilized power supply and may be respectively set to represent different levels of operation of the recorder. When the amplifier output reaches the level set by the selected potentiometer an output signal is produced by the comparator which energises relay coil RA to close contact RA1 connected in parallel with microswitch MS4 and thereby operate the trap index mechanism.

We claim:
1. Gas chromatography apparatus comprising the combination of:
    a chromatograph column having an outlet from which the column effluent can be derived,
    means for injecting a sample on to the column,
    a plurality of collecting traps for collecting the effluent from the column,
    a trap changing mechanism for presenting the collecting traps in turn to the outlet of the column,
    programme means producing control signals for controlling the operation of the trap changing mechanism,
    a chromatograph detector producing an output signal, a recorder device operated by the output signal of the chromatograph detector and producing a chromatogram, and means for synchronising the programme means with the chromatogram in response to a signal obtained when the output of the chromatograph detector attains at least one predetermined level.

2. Apparatus as claimed in claim 1, including means for stopping the programme means at any time during a programme and means for restarting the programme means at a predetermined level representative of a precise point on a chromatogram, thereby resynchronising the operation of the programme means with the chromatogram.

3. Apparatus as claimed in claim 1, wherein the programme means is a tape punched with holes representing the control signals and switch means are operated by the holes in the tape, said switch means controlling the operation of the trap changing mechanism.

4. Apparatus as claimed in claim 1, wherein the recorder device is a pen recorder and switch means are provided on the recorder, and means for causing said switch means on the recorder to be respectively operated by the movement of the pen on the recorder to different positions, the position of said switch means defining said predetermined levels.

5. Apparatus as claimed in claim 4, including means for adjusting the position of said switch means to enable the predetermined levels to be varied.

6. Apparatus as claimed in claim 4, including a switching circuit automatically to control the operation of the trap changing mechanism in accordance with a predetermined programme on said programme means, said switching circuit including a plurality of banks of manually operated switches, each bank containing a switch for each predetermined level, and a selector switch operable to select any of said banks of switches.

7. Apparatus as claimed in claim 6, wherein when a switch of a bank representing a predetermined level has been operated and that bank is selected by the selector switch, the operation of the corresponding level switch means on the recorder by the movement of the pen of the recorder causes the trap changing mechanism to operate.

8. Apparatus as claimed in claim 6, including a manually operated switch in each bank of switches, said manually operated switch, when operated together with one of the level switches of the associated bank and that bank is selected by the selector switch, operating to stop the programme means and to cause the selector switch to advance to the next bank of switches when the corresponding level switch on the recorder is operated by the movement of the pen of the recorder.

9. Apparatus as claimed in claim 8, wherein subsequent movement of the pen of the recorder causes the selector switch to advance to the next bank in which the further switch is not operated, which causes the restart of the programme means.

10. Apparatus as claimed in claim 1, including a comparator circuit for controlling the operation of the trap changing mechanism and means for feeding said comparator circuit with the output signal from the chromatograph detector and with a signal representing a predetermined level.

11. Apparatus as claimed in claim 10, including a plurality of potentiometer devices each producing a signal representing a predetermined level, and a selector switch for selectively connecting any one of said potentiometers to said comparator circuit.

12. Apparatus as claimed in claim 11, including a changeover switch connected between the selector switch and each potentiometer, whereby each potentiometer can only be connected to the comparator circuit through the selector switch when the associated changeover switch is in one of its positions.

13. Apparatus as claimed in claim 12, including relay means operated by the comparator circuit when the output signal from the chromatograph detector reaches the level signal from the selected potentiometer, and means for causing the operation of the relay means to operate the trap changing mechanism.

References Cited

UNITED STATES PATENTS

| | | | |
|---|---|---|---|
| 3,002,583 | 10/1961 | Findlay | 55—197 X |
| 3,174,326 | 3/1965 | Carle et al. | 55—67 X |
| 3,301,040 | 1/1967 | Levy et al. | 55—197 X |
| 3,158,019 | 11/1964 | Dora et al. | 73—23.1 |

JAMES L. DE CESARE, Primary Examiner

U.S. Cl. X.R.

73—23.1